(No Model.)
R. LATOWSKI.
PNEUMATIC BELL RINGING APPARATUS.
No. 284,311. Patented Sept. 4, 1883.
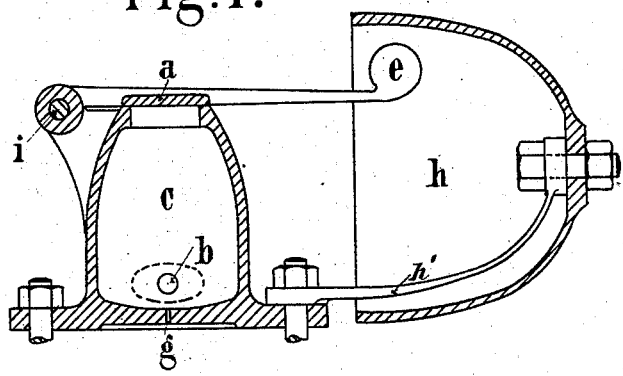
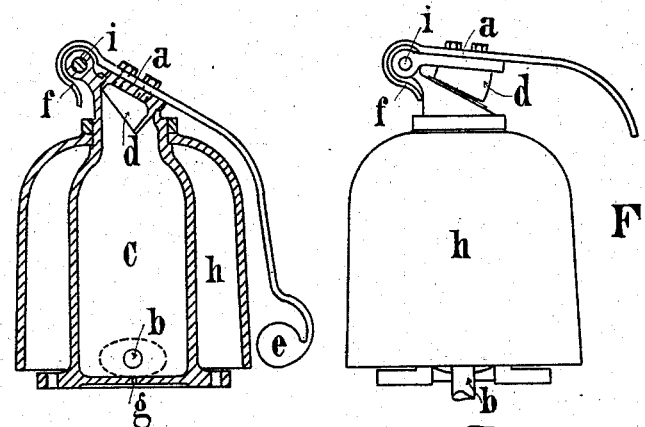
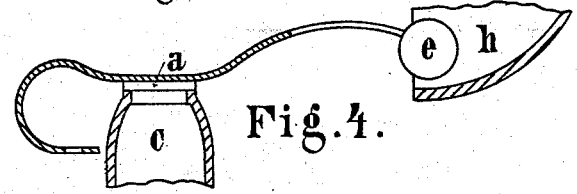
Witnesses.
Charles Walsteun
J. Gemmel, Jr.
Inventor
Robert Latowski
per Avery & Roeder
Attorney.

UNITED STATES PATENT OFFICE.

ROBERT LATOWSKI, OF OELS, PRUSSIA, GERMANY.

PNEUMATIC BELL-RINGING APPARATUS.

SPECIFICATION forming part of Letters Patent No. 284,311, dated September 4, 1883.

Application filed June 6, 1883. (No model.) Patented in Germany December 22, 1881, No. 18,546, and May 9, 1882, No. 20,618, and in Austria-Hungary October 27, 1882.

*To all whom it may concern:*

Be it known that I, ROBERT LATOWSKI, a subject of the King of Prussia, residing at Oels, Silesia, Prussia, Germany, have invented certain new and useful Improvements in Bell-Ringing Apparatus, of which the following is a specification.

My invention relates to bell-ringing apparatus actuated by steam, air, or gas, and has for its object to overcome the difficulties connected hitherto with the lubricating and keeping in order the usual steam ringing apparatus.

When steam, gas, or air of a certain pressure is escaping out of a vessel through an aperture provided with a valve, the latter will make a vibrating or dancing movement as long as the steam, gas, or air is admitted through a second aperture to the said vessel, or is generated in the same in a lower degree or pressure than the valve, in the same time, according to its diameter, permits the steam, gas, or air to escape. If the valve is opened, the tension in the vessel falls immediately to a certain degree, which causes the valve to close again, and to remain so for a short time, till the tension is again sufficiently increased by new admitted or generated steam, gas, or air to lift the valve. This principle is practically confirmed by all dancing safety-valves and pot-lids. It will be seen that this same vibratory or dancing motion of the valve will be produced if the valve is able to admit more steam, air, or gas into a vessel than in the same time is escaping through another aperture out of the vessel.

In the accompanying drawings, Figure 1 is a section of the apparatus having the bell or gong arranged at the side. Fig. 2 is a section of an apparatus with the bell or gong arranged around the vessel. Fig. 3 is an outside elevation of the apparatus shown in Fig. 2. Fig. 4 shows a section of the upper end of an apparatus with part of the bell, with slight modifications.

Similar letters represent similar parts in all the figures.

$c$ is the collecting-vessel, and $b$ the pipe for admitting steam, gas, or air into the same; $a$, the valve through which the pressure is allowed to escape from the vessel $c$. $h$ is the bell or gong, and $e$ the clapper.

The diameter of the valve $a$ must be in a certain degree larger than the diameter of the pipe $b$.

In Fig. 1 the bell $h$ is arranged on the side of the vessel $c$, supported by a suitable arm, $h'$.

In Figs. 2 and 3 the bell $h$ surrounds the vessel $c$, being attached to the same near its upper end or neck.

In Fig. 1 the valve $a$ is attached to the shaft of the clapper $e$, oscillating on its pivot $i$, and communicating the vibrations of the valve $a$ to the bell $h$.

In Fig. 2 the valve $a$ is provided with an internal projection or neck, $d$, acting as an untight piston—that is to say, the narrow space between the neck $d$ and the surrounding aperture of the vessel $c$ causes the steam to escape more slowly, and increases in this way the length of the lift of the valve $a$ and of the stroke of the clapper $e$. In order that the movement of the valve $a$ may not become too slow at the end of the lift, the end of the shaft of the clapper $e$ is made to surround the lugs of the pivot $i$, and is provided with a spring, $f$, pressing at the proper time against the vessel $c$, closing thereby the valve $a$ by the action of this spring $f$, as shown in Fig. 3.

In Fig. 4 the shaft of the clapper $e$ does not oscillate, but forms a spring attached to the valve $a$. The clapper $e$ strikes the bell $h$ when the valve $a$ is closing.

When steam is used in the apparatus, a small outlet-hole, $g$, Figs. 1 and 2, must be provided in the vessel $c$ for the condensed water.

What I claim as my invention, and desire to secure by Letters Patent, is—

1. In a bell-ringing apparatus actuated by steam, gas, or air, the combination of the vessel $c$ with the admitting-pipe $b$ and outwardly-opening valve $a$, larger in diameter than the pipe $b$, and secured to the shaft of the clapper, the clapper $e$, secured to a shaft oscillating on a bolt, $i$, and the bell $h$, substantially as and for the purpose described.

2. In a bell-ringing apparatus actuated by steam, gas, or air, the combination of the vessel $c$, admitting-pipe $b$, and outwardly-opening valve $a$, provided with a neck, $d$, secured to the shaft of the clapper $e$, oscillating around the pivot $i$, the spring $f$ at the end of said shaft, and the bell $h$, arranged to operate as and for the purpose set forth.

3. In a bell-ringing apparatus actuated by steam, gas, or air, the combination of the vessel $c$, outwardly-opening valve $a$, secured to the shaft, or its equivalent, of the clapper, the spring forming the shaft of the clapper $e$, and bell $h$, as and for the purpose described.

In witness whereof I have hereunto signed my name in the presence of two subscribing witnesses.

ROBERT LATOWSKI.

Witnesses:
FRIEDRICH HENSCKLER,
HEINRICH KRUMSIEG.